UNITED STATES PATENT OFFICE.

HENRY H. FURBISH, OF YARMOUTH, MAINE.

IMPROVEMENT IN PROCESSES FOR RECOVERING ALKALIES USED FOR THE REDUCTION OF WOOD TO PAPER-PULP.

Specification forming part of Letters Patent No. 194,141, dated August 14, 1877; application filed September 7, 1876.

*To all whom it may concern:*

Be it known that I, HENRY H. FURBISH, of Yarmouth, in the county of Cumberland and State of Maine, have invented certain new and useful Improvements in Recovering Waste Alkalies for the Manufacture of Paper-Pulp from Wood; and I do hereby declare that the following is a full, clear, and exact description thereof, which will enable others skilled in the art to which it pertains to make and use the same.

My invention has relation to the manufacture of paper-pulp from wood, by the use of an alkaline solution to remove the proximates of the wood and defiber the same.

The invention consists in the method of treating the lees so as to effect an economy and render the proportion of the solution otherwise lost or consumed small. I will first describe the process with which my improvement is connected.

Wood or chips are first well saturated with an alkaline solution. The unabsorbed portion of the solution is then drawn off from around the wood.

A small quantity of water is then placed with the chips, and they are cooked by heat applied externally to the vessel in which they are contained. The above steps are not claimed as part of this invention.

After heating in this manner has been completed and the proximates dissolved from the fibers of the wood, I discharge the mass into a percolating tank or vessel. In this tank the spent lees are washed out from the wood fiber, which has been, as above described, subjected to heat, and the said lees remain in the water contained in the tank. This water is first heated by having blown off into it the steam from the cooking-vessel, produced by the cooking of the saturated chips. The water may be heated by other steam than that mentioned, or by other means; but in the manner described an economy is effected.

The water is then evaporated, and the spent lees thus washed out from the cooked mass are sent to a recovery-furnace, and the ash recovered by any of the well-known processes. The recovered ash is then dissolved by boiling, and rendered caustical by the action of lime. I find the solution of ash cannot be practically rendered caustical at the strength at which I desire to use it. I therefore run it into an evaporating-pan, after it has been made caustic, at a strength of from 12° to 15° Baumé, and reduce it to the proper and necessary strength for use.

By this process I save about eighty per cent. of the amount of solution used at any time.

What I claim as my invention, and desire to secure by Letters Patent, is—

The process of economizing the alkaline solution used for reducing wood or wood chips to pulp for paper-manufacture, which consists in washing the spent lees from the cooked mass in water heated as herein described—that is, by steam blown off from the cooking-vessel—evaporating the water, recovering the ash in a recovery-furnace, boiling and rendering the recovered ash caustic by lime, evaporating the same, and reducing it to the proper strength for use, as herein described.

In testimony that I claim the foregoing as my own I affix my signature in presence of two witnesses.

HENRY H. FURBISH.

Witnesses:
HERBERT G. BRIGGS,
CHARLES E. CLIFFORD.